(12) United States Patent  (10) Patent No.: US 7,315,413 B2
Miyawaki et al.  (45) Date of Patent: Jan. 1, 2008

(54) ILLUMINATION APPARATUS FOR MICROSCOPE

(75) Inventors: Atsushi Miyawaki, Wako (JP); Takashi Fukano, Tokyo (JP); Yasushi Aono, Yokohama (JP)

(73) Assignees: Riken, Wako-Shi (JP); Olympus Corporation, Tokyo (JP)

( * ) Notice: Subject to any disclaimer, the term of this patent is extended or adjusted under 35 U.S.C. 154(b) by 0 days.

(21) Appl. No.: 11/269,408

(22) Filed: Nov. 8, 2005

(65) Prior Publication Data

US 2006/0098418 A1 May 11, 2006

(30) Foreign Application Priority Data

Nov. 11, 2004 (JP) ............................. 2004-328002

(51) Int. Cl.
G02B 21/06 (2006.01)
G02B 21/00 (2006.01)

(52) U.S. Cl. ...................... 359/385; 359/368; 359/372; 359/618

(58) Field of Classification Search ........ 359/368–390, 359/618–641; 351/200–247
See application file for complete search history.

(56) References Cited

U.S. PATENT DOCUMENTS 5,264,879 A * 11/1993 Shikama ...................... 353/31
6,262,837 B1 7/2001 Nagano et al. ............... 359/368
6,310,726 B1 * 10/2001 Iizuka ......................... 359/618
2002/0020800 A1 2/2002 Knebel et al. ............ 250/201.3
2003/0048530 A1 * 3/2003 Sander ........................ 359/389
2004/0120034 A1 6/2004 Miyawaki et al. .......... 359/385

FOREIGN PATENT DOCUMENTS

DE 42 21 063 A1 1/1994
JP 7-056092 A 3/1995
JP 10-090608 A 4/1998
JP 2004-177662 A 6/2004

OTHER PUBLICATIONS

English translation of the Japanese reference No. 2004-177662.*

* cited by examiner

*Primary Examiner*—Thong Q Nguyen
(74) *Attorney, Agent, or Firm*—Frishauf, Holtz, Goodman & Chick, P.C.

(57) ABSTRACT

An illumination apparatus for a microscope includes a light source portion that projects a light beam, two splitting elements that split the light beam into three, wavelength selection elements that independently select transmission wavelengths of the three light beams, shutters that independently shield or guide the three light beams, a first combining element that combines optical paths of two light beams, a second combining element that combines an optical path of the remaining light beam with a combined optical path, a pinhole that is located on an optical path between the first and second combining elements and has an aperture that selectively transmits only part of a light beam, and a projection optical system that applies a light beam from the second combining element to a sample and, when applying a light beam from the pinhole to the sample, projects the aperture of the pinhole onto the sample.

20 Claims, 6 Drawing Sheets

ILLUMINATION APPARATUS FOR MICROSCOPE

CROSS-REFERENCE TO RELATED APPLICATIONS

This application is based upon and claims the benefit of priority from prior Japanese Patent Application No. 2004-328002, filed Nov. 11, 2004, the entire contents of which are incorporated herein by reference.

BACKGROUND OF THE INVENTION

1. Field of the Invention

The present invention relates to an illumination apparatus for a microscope.

2. Description of the Related Art

In the research of analyzing the dynamics and functions of organization intracellular proteins and an organelle, an experiment is widely performed in which a specific intracellular portion is irradiated with light to observe a resultant reaction. This experiment uses a fluorescence sample obtained by labeling a fluorescent material, which causes a photoirradiation reaction, with a specific intracellular material as the observation target by antibody staining or gene injection. In accordance with the aspects of the photoirradiation reactions of various fluorescent materials, experiment schemes that enhance the features of the fluorescent materials have been proposed.

A typical example of the experiment scheme includes one (to be referred to as Caged experiment hereinafter) that uses a reagent called a Caged compound. The Caged compound is a material obtained by chemically modifying a physiologically active material by a protecting group to inactivate it. When the Caged compound is irradiated with ultraviolet light (having a center wavelength of approximately 360 nm), its protecting group dissociates to locally free a necessary physiologically active material. By using these characteristics, only a portion irradiated with the ultraviolet light can be activated. Thus, this scheme is widely used as a scheme that controls the location and time where the intracellular protein is to be activated.

Another typical example is an experiment (to be referred to as kaede experiment hereinafter) that uses a fluorescent protein called kaede (to be referred to as kaede protein hereinafter). The characteristic feature of the kaede protein is as follows. When the kaede protein is irradiated with light having a wavelength range of approximately 405 nm, the peak of the fluorescence wavelength changes from 518 nm (green) to 580 nm (red). When a gene of the kaede protein is injected into a desired intracellular protein and allowed to express, the portion irradiated with 405-nm light emits red fluorescence while the remaining portion emits green fluorescence. By using this characteristic feature, when a desired intracellular portion is irradiated with 405-nm light, only a protein that locally exists there can be discolored to red. Thus, how the red protein propagates in the cell can be observed. Also, the entire cell can be discolored to red to discriminate it from other cells.

In both the Caged experiment and kaede experiment, during the fluorescence observation, a desired portion is irradiated with ultraviolet light or 405-nm light (to be referred to as stimulus light hereinafter) at a desired timing. Then, how the dynamics of the fluorescence differ before and after the irradiation and how the protein propagates in the cell are observed. Therefore, to conduct these experiments, two types of illumination, i.e., local illumination and fluorescence observation illumination, are required. In the local illumination, stimulus light is locally applied to a desired position in the observation range of the sample. In the fluorescence observation illumination, excitation light is applied to the entire observation range. In particular, assume that intracellular protein diffusion or activating phenomenon occurs within a short period of time of several sec to 1 sec or less. In this case, fluorescence observation illumination must be able to be performed while performing local illumination simultaneously.

Conventionally, illumination apparatuses have been disclosed that applies two types of illumination to the sample simultaneously.

An illumination apparatus disclosed in Jpn. Pat. Appln. KOKAI Publication No. 07-056092 comprises independently a local illumination optical system 623 and a fluorescence observation illumination optical system 622, as shown in FIG. 6. The local illumination optical system 623 comprises a light source 641 and a local illumination stop 645. The fluorescence observation illumination optical system 622 comprises a light source 631 and a field stop 634. Local illumination light from the local illumination optical system 623 and fluorescence observation illumination light from the observation illumination optical system 622 are combined by a dichroic mirror 635. Thus, the two light beams are applied to a sample S simultaneously through a field stop projection lens 636, and a dichroic mirror 625 and an objective lens 624 of an observation optical system 621.

An illumination apparatus disclosed in Jpn. Pat. Appln. KOKAI Publication No. 10-090608 is configured as follows, as shown in FIG. 7. Excitation light C output from an excitation light source 732 is applied to a sample 750 through a condenser lens 733, a bandpass filter 734, dichroic mirrors 735 and 741, and an objective lens 742. A light beam projected from an irradiation light source 710 is split by a branching optical system 720. The split light beams are locally applied to the different positions of the sample 750 through a condenser lens 731, the dichroic mirrors 735 and 741, and the objective lens 742.

An illumination apparatus disclosed in Jpn. Pat. Appln. KOKAI Publication No. 2004-177662 is configured as follows, as shown in FIG. 8. A light beam of illumination light projected from a light source 811 is split into three light beams by half mirrors 821 and 881. The three split light beams are subjected to wavelength selection by excitation filters 824A, 824B, and 8240. The three light beams having the selected wavelengths are combined by half mirrors 882 and 825 into one light beam to be applied to a sample 843 via a dichroic mirror 841 and an objective lens 842.

When conducting Caged experiment or kaede experiment, it must be checked in advance whether the position of local illumination on the sample coincides with the position desired by the person in charge of the experiment. As soon as irradiation with stimulus light is started, the sample starts reaction. To check the position of local illumination in advance, local illumination must be performed using visible light having a wavelength range that does not cause reaction. This visible light will be referred to as guide light hereinafter. The guide light desirably has a long wavelength range (e.g., red light) that is separated as far as possible from the wavelength range of the stimulus light.

BRIEF SUMMARY OF THE INVENTION

The present invention is directed to an illumination apparatus for a microscope. An illumination apparatus according to the invention comprises a light source portion that projects a light beam, a first light beam splitting element that splits the light beam projected from the light source portion into two light beams, a second light beam splitting element that splits one of the two light beams split by the first light beam splitting element into two light beams, transmission wavelength selection elements that independently select transmission wavelengths of the three light beams split by the first and second light beam splitting elements, respectively, shutters that independently shield or guide the three light beams split by the first and second light beam splitting elements, respectively, a first light beam combining element that combines optical paths of two of the three light beams split by the first and second light beam splitting elements, a second light beam combining element that combines an optical path of remaining one of the three light beams split by the first and second light beam splitting elements with an optical path combined by the first light beam combining element, a pinhole that is located on an optical path between the first and second light beam combining elements and has an aperture that selectively transmits only part of a light beam, and a projection optical system that applies a light beam from the second light beam combining element to a sample and, when applying a light beam from the pinhole to the sample, projects the aperture of the pinhole onto the sample.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

The embodiment of the present invention will be described with reference to the views of the accompanying drawing.

Figure 1:
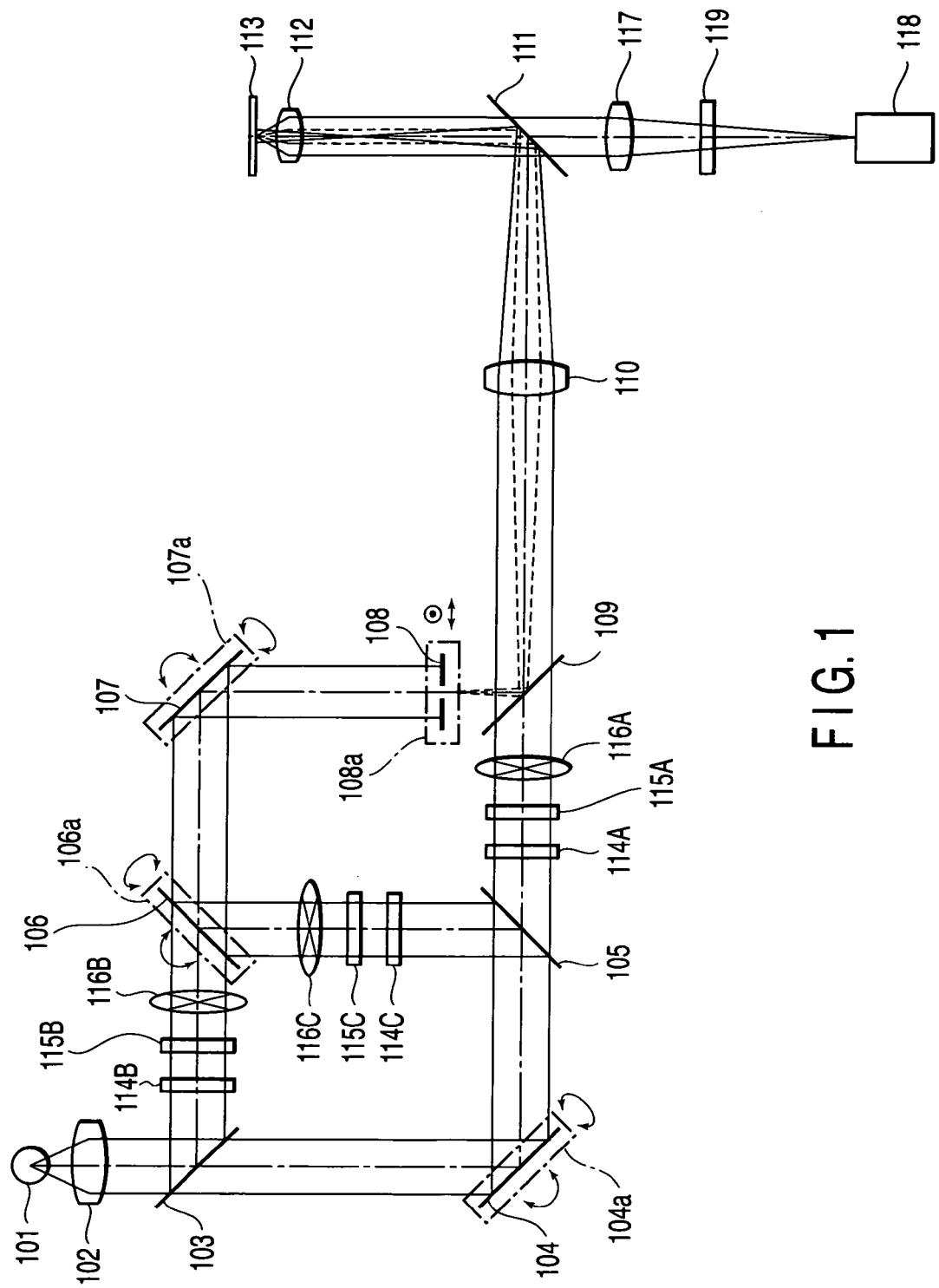
FIG. 1 shows the structure of a microscope according to an embodiment of the present invention.

This embodiment is directed to a microscope comprising an illumination apparatus to which the present invention is applied. FIG. 1 shows the structure of the microscope according to this embodiment of the present invention.

As shown in FIG. 1, the illumination apparatus for the microscope has a single light source 101, a collector lens 102 for forming a light beam from light emitted from the light source 101, and a half mirror 103 serving as a light beam splitting element to split the light beam into two light beams.

For example, the light source 101 is a mercury lamp or a xenon lamp, and emits light having a wavelength ranging from the ultraviolet wavelength range to the infrared wavelength range. The collector lens 102 converts the light emitted by the light source 101 into a collimated light beam. Namely, the light source 101 and collector lens 102 constitute a light source portion that projects a collimated light beam.

The half mirror 103 is located on the optical path of the collimated light beam formed by the collector lens 102. The half mirror 103 reflects part of the entering light beam and transmits part of the entering light beam. Namely, the half mirror 103 splits the light beam projected from the light source portion into two light beams.

The illumination apparatus for the microscope further has a reflecting mirror 104 for reflecting the light beam transmitted through the half mirror 103 and a half mirror 105 serving as a light beam splitting element that splits the reflected light beam into two light beams.

The reflecting mirror 104 is located on the optical path of the collimated light beam transmitted through the half mirror 103. The reflecting mirror 104 reflects the collimated light beam approximately 100%. A reflecting mirror 107 is located on the optical path of the collimated light beam reflected by the half mirror 103. The reflecting mirror 107 reflects the collimated light beam approximately 100%.

The half mirror 105 is located on the optical path of the collimated light beam reflected by the reflecting mirror 104. The half mirror 105 reflects part of the entering light beam and transmits part of the entering light beam. Namely, the half mirror 105 splits the light beam entering from the reflecting mirror 104 into two light beams. Therefore, the half mirrors 103 and 105 constitute a light beam splitting means for splitting the light beam projected from the light source portion into three light beams.

The illumination apparatus for the microscope further has a half mirror 106 serving as a light beam combining element or light beam combining means for combining the optical paths of two of the three light beams split by the half mirrors 103 and 105, the reflecting mirror 107 for reflecting the light beam from the half mirror 106, and a pinhole 108 having an aperture that selectively transmits part of the light beam from the reflecting mirror 107.

The half mirror 106 is located at the intersection of the optical path of the collimated light beam reflected by the half mirror 103 and the collimated light beam reflected by the half mirror 105. The half mirror 106 reflects part of the entering light beam and transmits part of the entering light beam. More specifically, the half mirror 106 transmits the collimated light beam reflected by the half mirror 103, and reflects the collimated light beam reflected by the half mirror 105. The half mirror 106 is located so that the traveling direction of the collimated light entering from the half mirror 103 and transmitted through it substantially coincides with the traveling direction of the collimated light beam entering from the half mirror 105 and reflected by it.

Furthermore, the traveling direction of the collimated light beam traveling from the half mirror 105 and reflected by the half mirror 106 should completely coincide with the traveling direction of the collimated light beam traveling from the half mirror 103 and transmitted through the half mirror 106. For this purpose, the half mirror 106 has an angle adjustment mechanism 106a. Although not shown particularly, the angle adjustment mechanism 106a adjusts angles about two axes, as schematically indicated by arrows. While the half mirror 106 has the angle adjustment mechanism in this case, alternatively, the half mirror 105 may have an angle adjustment mechanism instead. Naturally, both the half mirrors 105 and 106 may respectively have angle adjustment mechanisms. Namely, it suffices as far as at least one of the half mirrors 105 and 106 has an angle adjustment mechanism.

The pinhole 108 is located on the optical path of the collimated light beam reflected by the reflecting mirror 107, and selectively transmits only part of the collimated light beam. The pinhole 108 has a position adjustment mechanism 108a. Although not shown particularly, the position adjustment mechanism 108a moves the aperture of the pinhole 108 within a plane perpendicular to the optical path of the light beam that passes through the pinhole 108, as schematically indicated by arrows.

The illumination apparatus for the microscope further has a half mirror 109 serving as a light beam combining element or a light beam combining means for combining the optical path of the remaining one of the three light beams split by the half mirrors 103 and 105 with the optical path combined by the half mirror 106.

The half mirror 109 is located at the intersection of the optical path of the collimated light beam reflected by the reflecting mirror 107 and the collimated light beam transmitted through the half mirror 105. The half mirror 109 reflects part of the entering light beam and transmits part of the entering light beam. More specifically, the half mirror 109 reflects the collimated light beam reflected by the reflecting mirror 107 and transmits the collimated light beam transmitted through the half mirror 105. The half mirror 109 is located so that the traveling direction of the collimated light beam entering from the half mirror 105 and transmitted through the half mirror 109 substantially coincides with the traveling direction of the collimated light beam entering from the reflecting mirror 107 and reflected by the half mirror 109.

The traveling direction of the collimated light beam entering from the half mirror 105 and transmitted through the half mirror 109 should completely coincide with the traveling direction of the collimated light beam entering from the reflecting mirror 107 and reflected by the half mirror 109. For this purpose, the reflecting mirrors 104 and 107 respectively have angle adjustment mechanisms 104a and 107a. Although not shown particularly, each of the angle adjustment mechanisms 104a and 107a adjusts angles about two axes, as schematically indicated by arrows.

The illumination apparatus for the microscope further has a projection optical system to apply the light beam from the half mirror 109 to a sample 113. The projection optical system includes a projection lens 110, a half mirror 111, and an objective lens 112. When applying the light beam from the pinhole 108 to the sample 113, the projection optical system projects the aperture of the pinhole 108 onto the sample 113.

The projection lens 110 is located on the optical path of the light beam from the half mirror 109 and converts the collimated light beam transmitted through the half mirror 109 into a converging light beam. The half mirror 111 is located on the optical path of the light beam from the projection lens 110 and reflects the light beam from the projection lens 110. The objective lens 112 is located on the optical path of the light beam reflected by the half mirror 111. The objective lens 112 is positioned so that its rear focal position coincides with the convergent point of the converging light beam from the projection lens 110. The objective lens 112 converts the converging light beam formed by the projection lens 110 into a collimated light beam.

The projection lens 110 is positioned so that its focal position coincides with the pinhole 108. The projection lens 110 converts a diverging light beam transmitted through the pinhole 108 and reflected by the half mirror 109 into a collimated light beam. The objective lens 112 converts the collimated light beam that travels from the pinhole 108 and is formed by the projection lens 110 into a converging light beam.

The sample 113 is located at the focal position of the objective lens 112, i.e., at a position optically conjugate with the pinhole 108 positioned at the focal position of the projection lens 110. The sample 113 reacts upon irradiation with light having a specific wavelength range to emit fluorescence. The half mirror 111 transmits the fluorescence emitted by the sample 113.

The illumination apparatus for the microscope further has three bandpass filters 114A, 114B, and 114C serving as transmission wavelength selection elements or transmission wavelength selecting means for selecting independently the transmission wavelengths of the three light beams split by the half mirrors 103 and 105, respectively, light reduction filters 115A, 115B, and 115C serving as light reduction elements or light reducing means for reducing independently the three light beams, respectively, and shutters 116A, 116B, and 116C for shielding or guiding independently the three light beams, respectively.

The bandpass filter 114A, light reduction filter 115A, and shutter 116A are located on the optical path of the collimated light beam from the half mirror 105 to the half mirror 109. The bandpass filter 114B, light reduction filter 115B, and shutter 116B are located on the optical path of the collimated light beam from the half mirror 103 to the half mirror 106. The bandpass filter 114C, light reduction filter 115C, and shutter 116C are located on the optical path of the collimated light beam from the half mirror 105 to the half mirror 106.

The bandpass filters 114A, 114B, and 114C can be easily inserted in and removed from the optical paths of the corresponding collimated light beams, and transmit, of the corresponding collimated light beams, only light having specific wavelength ranges, respectively.

The light reduction filters 115A, 115B, and 115C can be easily inserted in and removed from the optical paths of the corresponding collimated light beams, and adjust independently the quantities of light of the corresponding collimated light beams, respectively.

The shutters 116A, 116B, and 116C can be opened and closed independently.

The microscope further has an imaging lens 117 for focusing the fluorescence emitted from the sample 113 and forming the projection image of the aperture of the pinhole 108, a camera 118 for imaging the sample 113, and a fluorescence filter 119 that selectively transmits, of the fluorescence emitted by the sample 113, only light having a specific wavelength range.

The imaging lens 117 is located on the optical path of the light beam (the fluorescence emitted from the sample 113 or light from the projection image of the aperture of the pinhole 108) transmitted through the half mirror 111. The imaging lens 117 converts the light beam transmitted through the half mirror 111 into a converging light beam. The camera 118 is positioned at the focal position of the imaging lens 117, i.e., at a position optically conjugate with the sample 113 located at the focal position of the objective lens 112. The fluorescence filter 119 is located on the optical path from the imaging lens 117 to the camera 118 and can be easily inserted in and removed from the optical path.

Figure 2:
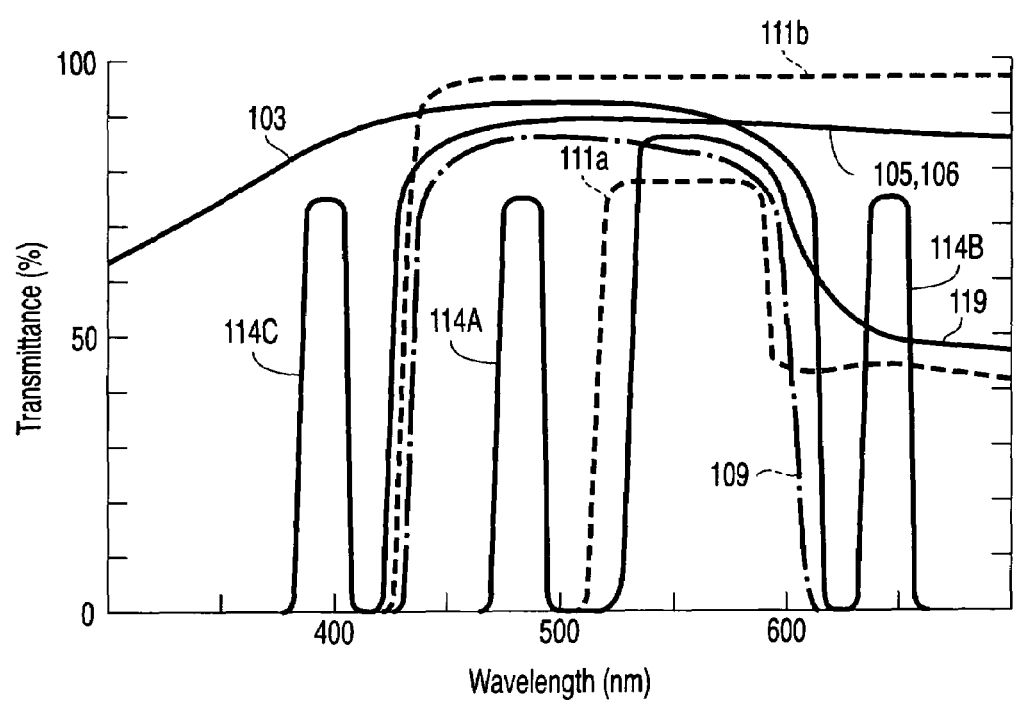
FIG. 2 shows the transmittance characteristics of band-pass filters, a fluorescence filter, and half mirrors.

An example concerning wavelength selection of the respective optical paths of this embodiment will be described. FIG. 2 shows the transmittance characteristics of the bandpass filters, fluorescence filter, and half mirrors. The bandpass filter 114A has the following characteristics. That is, the bandpass filter 114A transmits only light having, of the wavelength range of, e.g., 420 nm to 600 nm, a desired wavelength range that matches the excitation wavelength range of the fluorescent material of the sample 113. The bandpass filter 114B has the following characteristics. That is, the bandpass filter 114B transmits only light having, of a visible range of 600 nm or more, a desired wavelength range that falls outside the fluorescence wavelength range of the fluorescent material of the sample 113 to the long wavelength side. The bandpass filter 114C has the following characteristics. That is, the bandpass filter 114C transmits only light having a desired wavelength range that matches the stimulus wavelength range corresponding to the application. In the case of Caged experiment, the bandpass filter 114C transmits only light having a predetermined wavelength range with respect to 360 nm as the center wavelength. In the case of kaede experiment, the bandpass filter 114C transmits only light having a predetermined wavelength range with respect to 405 nm as the center wavelength. Thus, light transmitted through the bandpass filter 114A is subjected to wavelength selection as the excitation light for the sample 113. Light transmitted through the bandpass filter 114B is subjected to wavelength selection as the guide light. Light transmitted through the bandpass filter 114C is subjected to wavelength selection as the stimulus light.

In order that each light subjected to wavelength selection is guided to the sample 113 effectively, the half mirrors 103, 105, 106, and 109 are preferably dichroic mirrors having wavelength dependent transmittance characteristics. For example, in the above case, the half mirror 103 transmits light having a shorter wavelength and reflects light having a longer wavelength than approximately 600 nm as a boundary. The half mirrors 105 and 106 reflect light having shorter wavelengths and transmit light having longer wavelengths than approximately 420 nm as a boundary. The half mirror 109 transmits light having a wavelength range from approximately 420 nm to approximately 600 nm and reflects light having a shorter wavelength than approximately 420 nm and light having a longer wavelength than approximately 600 nm.

The half mirror 111 desirably has the following characteristics (a curve 111a in FIG. 2). That is, the half mirror 111 reflects light having the transmission wavelength ranges of the bandpass filters 114A and 114C, that is, the excitation light and stimulus light. The half mirror 111 transmits light having the fluorescence wavelength range of the fluorescent material of the sample 113 highly efficiently. The half mirror 111 also reflects part of light having the transmission wavelength range of the bandpass filter 114B, that is, the guide light, and transmits part of the guide light. A dichroic mirror having such complicated characteristics is difficult to manufacture and thus becomes expensive. In most cases, stimulus light requires a large quantity of light while excitation light and guide light having small quantities of light suffice. Therefore, in this case, as the half mirror 111, it is appropriate to select one having characteristics (a curve 111b in FIG. 2) of reflecting light having a shorter wavelength and transmitting approximately 90% to 95% (reflects approximately 5% to 10%) of light having a longer wavelength approximately 420 nm as a boundary.

The fluorescence filter 119 has the following characteristics. That is, the fluorescence filter 119 transmits light having the fluorescence wavelength range of the fluorescent material of the sample 113 and partly transmits light having the wavelength range of the guide light.

The operation of the illumination apparatus according to this embodiment will be described.

The light emitted from the light source 101 is converted into a collimated light beam by the collector lens 102 and enters the half mirror 103 to be split into two collimated light beams. The collimated light beam transmitted through the half mirror 103 is reflected by the reflecting mirror 104 and enters the half mirror 105 to be further split into two collimated light beams. Of the collimated light beam transmitted through the half mirror 105, only light having a desired wavelength range that matches the excitation wavelength range of the fluorescent material of the sample 113 is transmitted through the bandpass filter 114A. The quantity of transmitted light is then reduced by the light reduction filter 115A to have a predetermined quantity of light to form excitation light. Of the collimated light beam reflected by the half mirror 105, only light having a desired wavelength range that matches the stimulus wavelength range is transmitted through the bandpass filter 114C. The quantity of transmitted light is then reduced by the light reduction filter 115C to have a predetermined quantity of light to form stimulus light. Of the collimated light beam reflected by the half mirror 103, only light having a desired wavelength range that falls within the visible range of 600 nm or more but outside the fluorescence wavelength range of the fluorescent material of the sample 113 is transmitted through the bandpass filter 114B. The quantity of transmitted light is then reduced by the light reduction filter 115B to have a predetermined quantity of light to form guide light.

The excitation light transmitted through the half mirror 109 passes through the projection lens 110 to be converted into a converging light beam. Part of the converging light beam is reflected (the reflectance depends on the characteristics of the half mirror 111) by the half mirror 111 to focus near the rear focal position of the objective lens 112. The focused light then enters the objective lens 112. Successively, the excitation light passes through the objective lens 112 to be converted into a substantially collimated light beam again. The substantially collimated light beam is applied to the sample 113 located at the focal position of the objective lens 112 to excite the fluorescent material of the sample 113.

The stimulus light is reflected by the half mirror 106 and travels toward the reflecting mirror 107. The guide light is transmitted through the half mirror 106 and travels toward the reflecting mirror 107. After passing the half mirror 106, the stimulus light and guide light travel along the same optical path. The stimulus light and guide light are reflected by the reflecting mirror 107 and enter the pinhole 108. The stimulus light and guide light transmitted through the aperture of the pinhole 108 are reflected by the half mirror 109 and travel toward the projection lens 110. After passing the half mirror 109, the stimulus light and guide light travel along the same optical path as that of the excitation light. Namely, the stimulus light and guide light pass through the projection lens 110. Most of the stimulus light and part of the guide light are reflected (the reflectance depends on the characteristics of the half mirror 111) by the half mirror 111. The reflected stimulus light and guide light pass through the objective lens 112 and are applied to the sample 113 to form the projection image of the aperture of the pinhole 108.

The fluorescence emitted from the sample 113 and the projection image of the aperture of the pinhole 108 pass through the objective lens 112, half mirror 111, imaging lens 117, and fluorescence filter 119, projected to a position optically conjugate with the sample 113, and imaged by the camera 118.

This operation will be described in accordance with the experiment procedure.

First, with all of the shutters 116A, 116B, and 116C being closed, the light source 101 is turned on. Subsequently, only the shutter 116A is opened to apply the excitation light to the sample 113. The objective lens 112 is focused on the sample 113 while observing the fluorescence by the camera 118.

Then, the shutter 116B is opened. Thus, the guide light is combined with the excitation light by the half mirror 109. The combined light is applied to the sample 113 to form the projection image of the aperture of the pinhole 108 on the sample 113. The guide light has a wavelength range falling outside the fluorescence wavelength range of the fluorescent material of the sample 113 to the long wavelength side. Thus, the guide light can be discriminated from the fluorescence of the sample 113. If the guide light is difficult to discriminate, the shutter 116A may be closed temporarily, so that only the guide light is applied and confirmed. Even when the guide light is to be applied for a long period of time, since it falls outside the excitation wavelength range of the fluorescent material of the sample 113, color deterioration of the fluorescence will not be undesirably promoted. As the wavelength range of the guide light is also separate from the wavelength range that causes a stimulus reaction, application of the guide light will not undesirably initiate a stimulus reaction.

The aperture of the pinhole 108 is moved within a plane perpendicular to the optical path, while checking the irradiation position on the sample 113 with the guide light, so as to move the guide light to a desired position within the sample 113. The shutter 116C is opened at a desired timing. Thus, the stimulus light is combined with the guide light by the half mirror 106. The combined light is then further combined with the excitation light by the half mirror 109 to be applied to the sample 113. The stimulus light is applied to the sample 113 in this manner, so that the reaction of the sample 113 is observed while observing the fluorescence.

According to the embodiment described above, as the stimulus light and guide light pass through the aperture of one pinhole 108, the projection position of the aperture of the pinhole 108 onto the sample 113 that is formed by the stimulus light reliably coincides with the projection position formed by the guide light. Therefore, prior to start reaction of the sample 113 by applying the stimulus light, the irradiation position of the stimulus light can be checked by using the guide light, and can be accurately set at a desired position. The excitation light, guide light, and stimulus light can be shielded and guided independently by the shutters 116A, 116B, and 116C, respectively. Therefore, the excitation light, guide light, and stimulus light can be applied to the sample 113 simultaneously. Hence, no time loss occurs during observation, and an experiment with a fast reaction speed and an experiment in which time must be managed strictly can be conducted without any problems. As the excitation light, guide light, and stimulus light are formed by using one light source, a compact, inexpensive illumination apparatus can be formed. If the half mirrors 103, 105, 106, and 109 comprise dichroic mirrors, the light beams can be split and combined efficiently.

So far the embodiment of the present invention has been described with reference to the views of the accompanying drawing. Note that the present invention is not limited to the above embodiment, and various changes and modifications may be made without departing from the spirit and scope of the invention.

For example, the layout of the half mirrors and reflecting mirrors for splitting and synthesis of the light beam can be appropriately changed. In this case, different from the wavelength transmittance characteristics shown in FIG. 2, the half mirrors guide the light components that are wavelength selected in split optical paths to the sample 113 efficiently.

Figure 3:
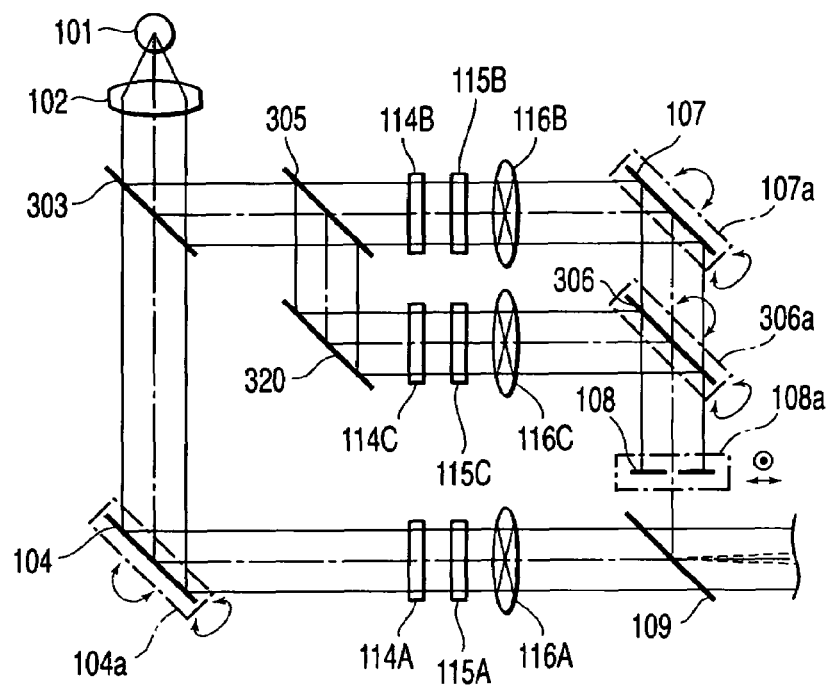
FIG. 3 shows the first modification of the layout of the half mirrors and reflecting mirrors of the first embodiment.

FIG. 3 shows the first modification of the layout of the half mirrors and reflecting mirrors of the first embodiment. Referring to FIG. 3, members that are denoted by the same reference numerals as those of the members shown in FIG. 1 are the same members. The illumination apparatus according to this modification has, in place of the half mirrors 103, 105, and 106 of FIG. 1, half mirrors 303, 305, and 306. The illumination apparatus of this modification also has a reflecting mirror 320 for reflecting a light beam reflected by the half mirror 305. The half mirror 303 is located on the optical path between the collector lens 102 and reflecting mirror 104. The half mirror 303 has the following characteristics. That is, the half mirror 303 transmits light having a wavelength range that covers from approximately 420 nm to approximately 600 nm, and reflects light having a shorter wavelength than approximately 420 nm and light having a longer wavelength than approximately 600 nm. The half mirror 305 is located on the optical path between the half mirror 303 and bandpass filter 114B. The reflecting mirror 320 is located on the optical path between the half mirror 305 and bandpass filter 114C. The half mirror 306 is located on the optical path between the reflecting mirror 107 and pinhole 108, and an angle adjustment mechanism 306a is provided for the half mirror 306. The half mirrors 305 and 306 have the following characteristics. That is, half mirrors 305 and 306 reflect light having a shorter wavelength and transmit light having a longer wavelength than approximately 420 nm as a boundary.

Figure 4:
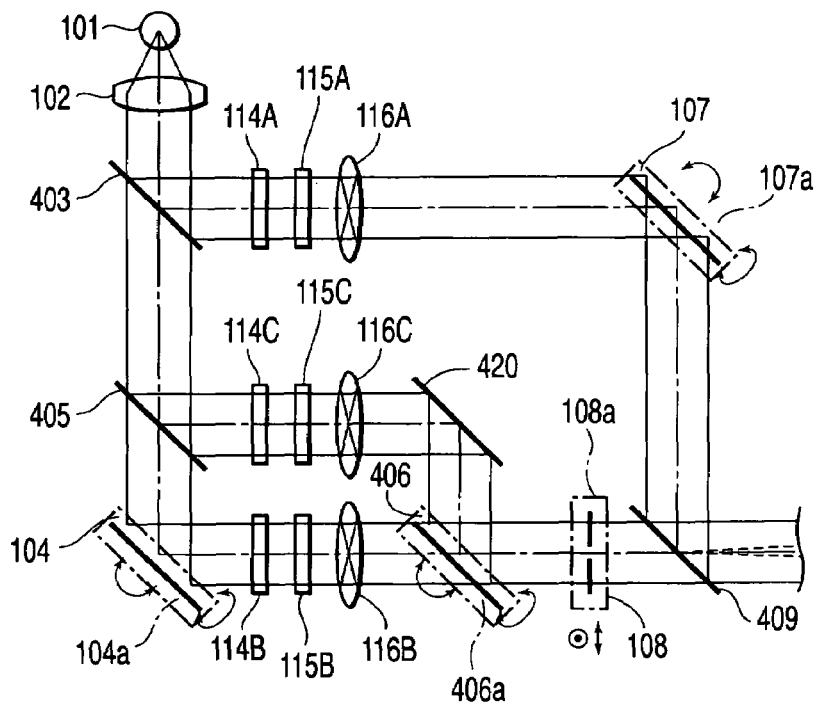
FIG. 4 shows the second modification of the layout of the half mirrors and reflecting mirrors of the first embodiment.

FIG. 4 shows the second modification of the layout of the half mirrors and reflecting mirrors of the first embodiment. Referring to FIG. 4, members that are denoted by the same reference numerals as those of the members shown in FIG. 1 are the same members. The illumination apparatus of this modification has, in place of the half mirrors 103, 105, 106, and 109 of FIG. 1, half mirrors 403, 405, 406, and 409. The illumination apparatus of this modification also has a reflecting mirror 420 for reflecting a light beam reflected by the half mirror 405 and transmitted through the bandpass filter 114C, light reduction filter 115C, and shutter 116C. The half mirror 403 is located on the optical path between the collector lens 102 and reflecting mirror 104. The half mirror 403 has the following characteristics. That is, the half mirror 403 reflects light having a wavelength range from approximately 420 nm to approximately 600 nm, and transmits light having a shorter wavelength than approximately 420 nm and light having a longer wavelength than approximately 600 nm. The half mirror 405 is located on the optical path between the half mirror 403 and reflecting mirror 104. The half mirror 406 is located on the optical path between the shutter 116B and pinhole 108, and an angle adjustment mechanism 406a is provided for the half mirror 406. The reflecting mirror 420 is located on the optical path between the shutter 116C and half mirror 406. The half mirrors 405 and 406 have the following characteristics. That is, the half mirrors 405 and 406 reflect light having a shorter wavelength and transmit light having a longer wavelength than approximately 420 nm as a boundary. The half mirror 409 has the following characteristics. That is, the half mirror 409 reflects light having a wavelength range from approximately 420 nm to approximately 600 nm and transmits light having a shorter wavelength than approximately 420 nm and light having a longer wavelength than approximately 600 nm.

As the bandpass filter 114A and fluorescence filter 119, desirably, those having suitable characteristics are selected from filters prepared in advance that have different wavelength characteristics, and are inserted in the optical beams. Then, fluorescent materials having different excitation wavelengths and fluorescence wavelength can be coped with. Desirably, the pinhole 108 is replaceable with any one of pinholes prepared in advance that have different diameters, so as to change the size of the aperture in accordance with the irradiation range of the required stimulus light.

Figure 5:
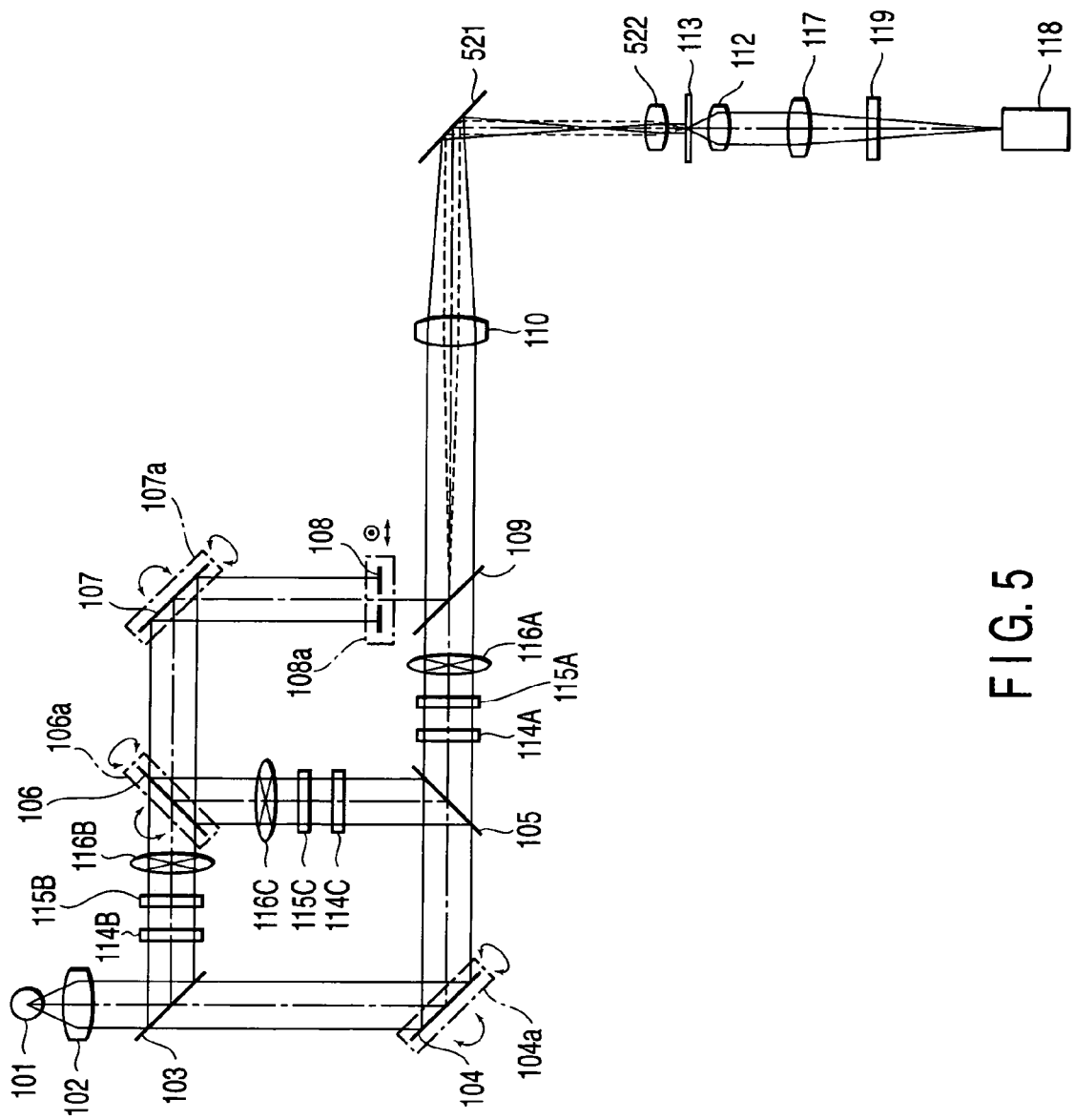
FIG. 5 shows an illumination apparatus with transmission illumination having an arrangement according to the present invention.
Figure 6:
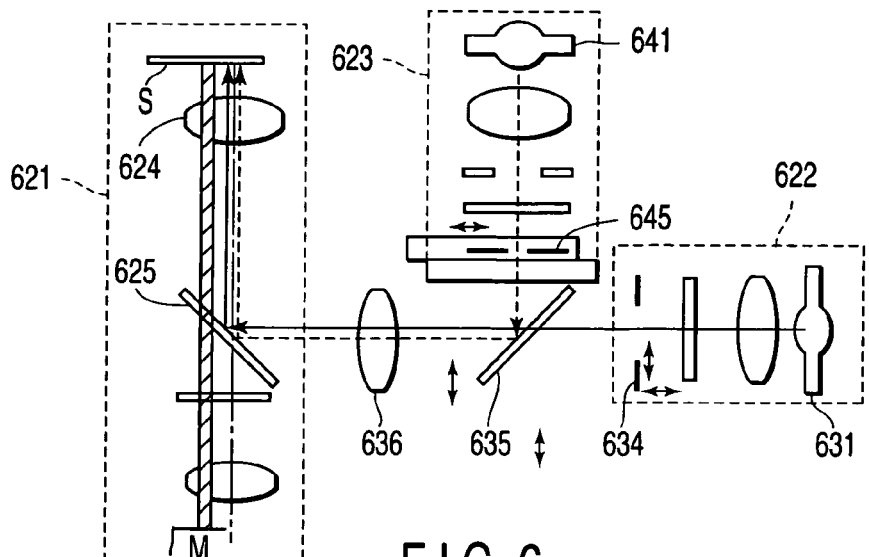
FIG. 6 schematically shows an illumination apparatus disclosed in Jpn. Pat. Appln. KOKAI Publication No. 07-056092.
Figure 7:
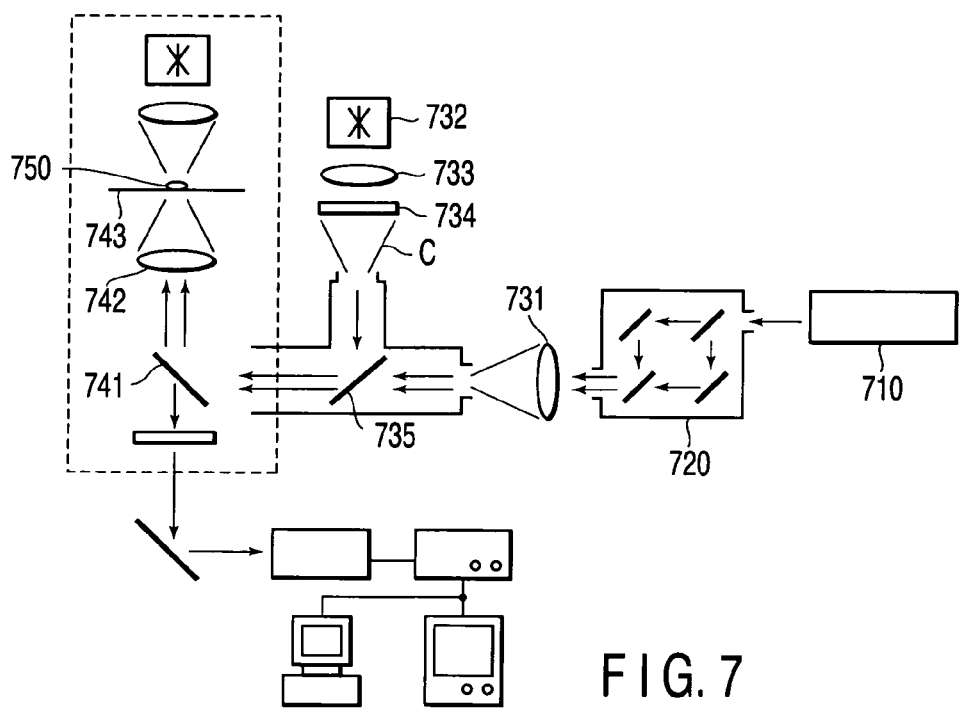
FIG. 7 schematically shows an illumination apparatus disclosed in Jpn. Pat. Appln. KOKAI Publication No. 10-090608.
Figure 8:
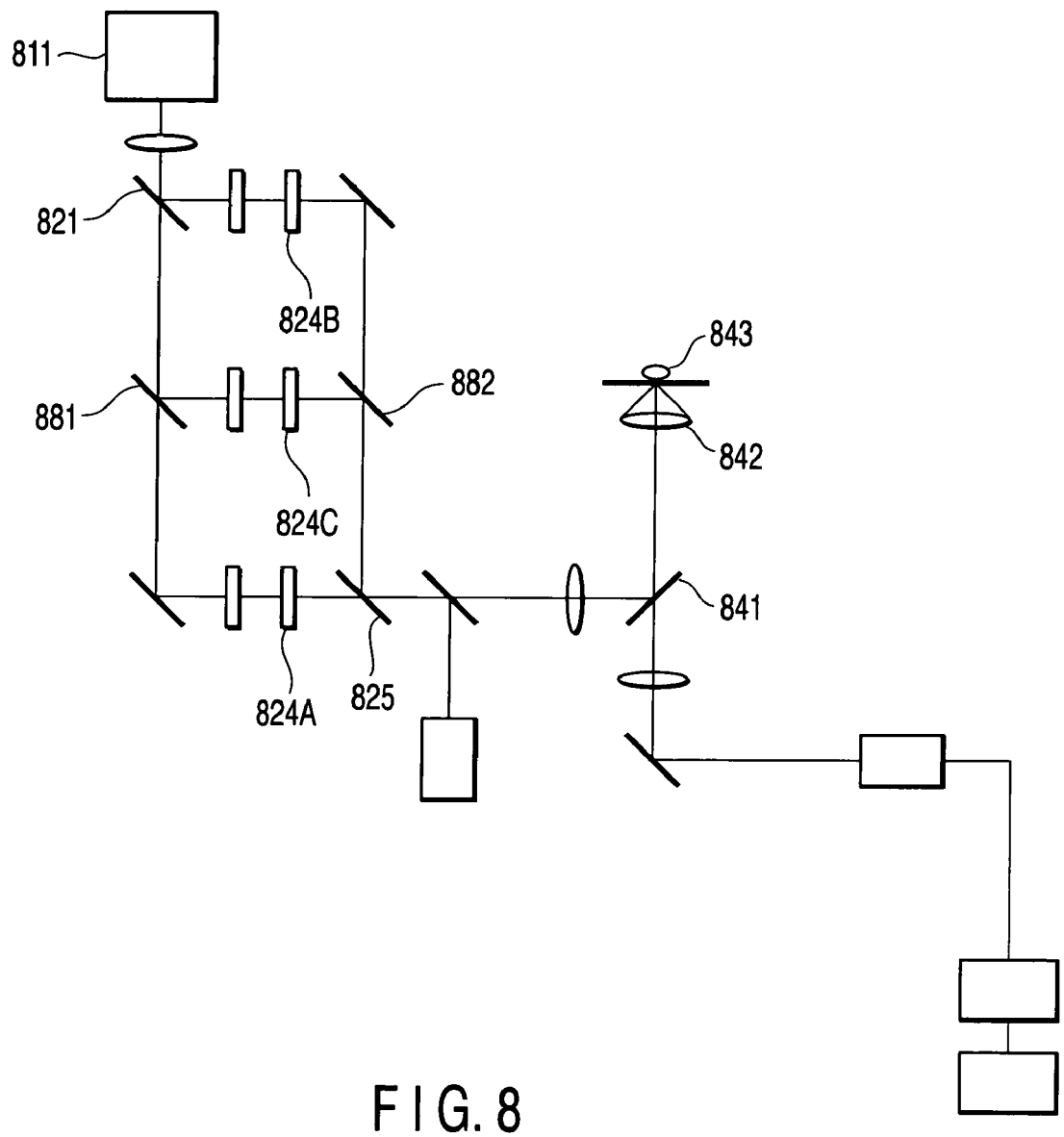
FIG. 8 schematically shows an illumination apparatus disclosed in Jpn. Pat. Appln. KOKAI Publication No. 2004-177662.

Although the illumination apparatus of this embodiment employs incident-light illumination, it may employ transmitting illumination. FIG. 5 shows an illumination apparatus employing transmitting illumination according to the present invention. Referring to FIG. 5, members that are denoted by the same reference numerals as those of the members shown in FIG. 1 are the same members. This illumination apparatus has a reflecting mirror 521 in place of the half mirror 111, and a condenser lens 522. The condenser lens 522 is located between the reflecting mirror 521 and sample 113 and serves in the same manner as the objective lens 112 of FIG. 1. The reflecting mirror 521 merely serves to bend the optical path, and accordingly it may be omitted when appropriate.

The sample 113 is imaged by the camera 118. Alternatively, in place of the camera 118, an eyepiece may be located to visually observe the sample 113.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An illumination apparatus for a microscope, comprising:
    a light source portion that projects a light beam;
    a first light beam splitting element that splits the light beam projected from the light source portion into a first light beam and a second light beam;
    a second light beam splitting element that splits the first light beam into a third light beam and a fourth light beam;
    a first light beam combining element that combines the second light beam and the third light beam into a fifth light beam;
    a second light beam combining element that combines the fourth light beam and the fifth light beam;
    a plurality of transmission wavelength selection elements that independently select transmission wavelengths of the second light beam, the third light beam, and the fourth light beam, respectively;
    a plurality of light reduction filters that independently reduce the second light beam, the third light beam, and the fourth light beam, respectively;
    a plurality of shutters that independently shield or guide the second light beam, the third light beam, and the fourth light beam, respectively;
    a pinhole that has an aperture which selectively transmits only a part of the fifth light beam; and
    a projection optical system that applies a light beam from the second light beam combining element to a sample and projects the aperture of the pinhole onto the sample;
    wherein: (i) light of a desired wavelength range, corresponding to an excitation wavelength range of a fluorescent material of the sample, of the fourth light beam is transmitted by a first one of the plurality of transmission wavelength selection elements, (ii) a quantity of the light of the desired wavelength range of the fourth light beam is reduced to a predetermined quantity by a first one of the plurality of light reduction filters to become excitation light, and (iii) when one of the shutters corresponding to the fourth light beam is opened, the excitation light is applied to the sample;
    wherein: (i) light of a desired wavelength range, corresponding to a stimulus wavelength range, of the third light beam is transmitted by a second one of the plurality of transmission wavelength selection elements, (ii) a quantity of the light of the desired wavelength range of the third light beam is reduced to a predetermined quantity by a second one of the plurality of light reduction filters to become stimulus light, and (iii) when one of the shutters corresponding to third light beam is opened, the stimulus light is applied to the sample; and
    wherein: (i) light of a desired wavelength range, which is in a visible light range and excludes a fluorescence wavelength range of the fluorescent material of the sample, of the second light beam is transmitted by a third one of the plurality of transmission wavelength selection elements, (ii) a quantity of the light of the desired wavelength range of the second light beam is reduced to a predetermined quantity by a third one of the plurality of light reduction filters to become guide light, and (iii) when at least one of the shutters corresponding to the second light beam is opened, a position of the pinhole projected on the sample is confirmed using the guide light.

2. The apparatus according to claim 1, wherein the projection optical system includes a projection lens, a half mirror and an objective lens; and
    wherein the apparatus further comprises:
        a fluorescence filter that selectively transmits light of a specific wavelength range from among fluorescence emitted from the sample; and
        an imaging lens that forms a projection image of the aperture of the pinhole projected on the sample and the fluorescence emitted from the sample.

3. The apparatus according to claim 1, further comprising a position adjustment mechanism to move the aperture of the pinhole within a plane perpendicular to an optical path of the fifth light beam.

4. The apparatus according to claim 1, further comprising:
a first reflecting mirror which is located between the first light beam splitting element and the second light beam splitting element, and which has an angle adjustment mechanism to adjust the first reflecting mirror about two axes; and
a second reflecting mirror, which is located between the first light beam combining element and the second light beam combining element, and which has an angle adjustment mechanism to adjust the second reflecting mirror about two axes.

5. The apparatus according to claim 1, wherein each of the first light beam splitting element, the second light beam splitting element, the first light beam combining element, and the second light beam combining element comprises a half mirror.

6. The illumination apparatus according to claim 1, further comprising a camera that images the sample.

7. An illumination apparatus for a microscope, comprising:
a light source portion that projects a light beam;
a first light beam splitting element that splits the light beam projected from the light source portion into a first light beam and a second light beam;
a second light beam splitting element that splits the second light beam into a third light beam and a fourth light beam;
a first light beam combining element that combines the third light beam and the fourth light beam into a fifth light beam;
a second light beam combining element that combines the first light beam and the fifth light beam;
a plurality of transmission wavelength selection elements that independently select transmission wavelengths of the first light beam, the third light beam, and the fourth light beam, respectively;
a plurality of light reduction filters that independently reduce the first light beam, the third light beam, and the fourth light beam, respectively;
a plurality of shutters that independently shield or guide the first light beam, the third light beam, and the fourth light beam, respectively;
a pinhole that has an aperture which selectively transmits only a part of the fifth light beam; and
a projection optical system that applies a light beam from the second light beam combining element to a sample and projects the aperture of the pinhole onto the sample;
wherein: (i) light of a desired wavelength range, corresponding to an excitation wavelength range of a fluorescent material of the sample, of the first light beam is transmitted by a first one of the plurality of transmission wavelength selection elements, (ii) a quantity of the light of the desired wavelength range of the first light beam is reduced to a predetermined quantity by a first one of the plurality of light reduction filters to become excitation light, and (iii) when one of the shutters corresponding to the first light beam is opened, the excitation light is applied to the sample;
wherein: (i) light of a desired wavelength range, corresponding to a stimulus wavelength range, of the fourth light beam is transmitted by a second one of the plurality of transmission wavelength selection elements, (ii) a quantity of the light of the desired wavelength range of the fourth light beam is reduced to a predetermined quantity by a second one of the plurality of light reduction filters to become stimulus light, and (iii) when one of the shutters corresponding to the fourth light beam is opened, the stimulus light is applied to the sample; and
wherein: (i) light of a desired wavelength range, which is in a visible light range and excludes a fluorescence wavelength range of the fluorescent material of the sample, of the third light beam is transmitted by a third one of the plurality of transmission wavelength selection elements, (ii) a quantity of the light of the desired wavelength range of the third light beam is reduced to a predetermined quantity by a third one of the plurality of light reduction filters to become guide light, and (iii) when at least one of the shutters corresponding to the third light beam is opened, a position of the pinhole projected on the sample is confirmed using the guide light.

8. The apparatus according to claim 7, wherein the projection optical system includes a projection lens, a half mirror and an objective lens; and
wherein the apparatus further comprises:
a fluorescence filter that selectively transmits light of a specific wavelength range from among fluorescence emitted from the sample; and
an imaging lens that forms a projection image of the aperture of the pinhole projected on the sample and the fluorescence emitted from the sample.

9. The apparatus according to claim 7, further comprising a position adjustment mechanism to move the aperture of the pinhole within a plane perpendicular to an optical path of the fifth light beam.

10. The apparatus according to claim 7, further comprising:
a first reflecting mirror which is located between the first light beam splitting element and the second light beam combining element, and which has an angle adjustment mechanism to adjust the first reflecting mirror about two axes; and
a second reflecting mirror which is located between the second light beam splitting element and the first light beam combining element, and which has an angle adjustment mechanism to adjust the second reflecting mirror about two axes.

11. The apparatus according to claim 7, wherein each of the first light beam splitting element, the second light beam splitting element, the first light beam combining element, and the second light beam combining element comprises a half mirror.

12. The illumination apparatus according to claim 7, further comprising a camera that images the sample.

13. An illumination apparatus for a microscope, comprising:
a light source portion that projects a light beam;
light beam splitting means for splitting the light beam projected from the light source portion into three light beams;
transmission wavelength selecting means for selecting transmission wavelengths for the three light beams split by the light beam splitting means independently for each of the three light beams;
shutters for shielding or guiding the three light beams split by the light beam splitting means independently for each of the three light beams;
first light beam combining means for combining optical paths of two of the three light beams split by the light beam splitting means;
second light beam combining means for combining an optical path of a remaining one of the three light beams split by the light beam splitting means with an optical path from the first light beam combining means;

a pinhole, which is located between the first light beam combining means and the second light beam combining means on the optical path from the first light beam combining means, and which has an aperture that selectively transmits only part of a light beam; and a projection optical system which applies a light beam from the second light beam combining means to a sample, and which, when applying a light beam from the pinhole to the sample, projects the aperture of the pinhole onto the sample, wherein: (i) light of a desired wavelength range, corresponding to a stimulus wavelength range, of a first one of the two light beams having optical paths combined by the first light beam combining means, is transmitted by a first one of the plurality of transmission wavelength selection elements to become stimulus light, (ii) light of a desired wavelength range, which is in a visible light range and excludes a fluorescence wavelength range of a fluorescent material of the sample, of a second one of the two light beams having optical paths combined by the first light beam combining means, is transmitted by a second one of the plurality of transmission wavelength selection elements to become guide light, and (iii) light of a desired wavelength range, corresponding to an excitation wavelength range of the fluorescent material of the sample, of said remaining one of the three light beams split by the light beam splitting means, is transmitted by a third one of the plurality of transmission wavelength selection elements to become excitation light; and wherein, when one of the shutters corresponding to the stimulus light is opened the stimulus light is applied to the sample through the aperture, when one of the shutters corresponding to the guide light is opened the guide light is applied to the sample through the aperture, and when one of the shutters corresponding to the excitation light is opened the excitation light is applied to the sample.

14. The apparatus according to claim 13, wherein the projection optical system includes a projection lens, a half mirror and an objective lens, and wherein the apparatus further comprises:

a fluorescence filter that selectively transmits light of a specific wavelength range from among fluorescence emitted from the sample; and an imaging lens that forms a projection image of the aperture of the pinhole projected on the sample and the fluorescence emitted from the sample.

15. The apparatus according to claim 13, further comprising light reducing means for reducing the three light beams split by the light beam splitting means independently for each of the three light beams.

16. The apparatus according to claim 13, further comprising a position adjustment mechanism to move the aperture of the pinhole within a plane perpendicular to the optical path from the first light beam combining means.

17. The apparatus according to claim 13, wherein the light beam splitting means comprises first light beam splitting means for splitting the light beam projected from the light source portion into two light beams, and second light beam splitting means for splitting one of the two light beams from the first light beam splitting means into two light beams; and wherein the apparatus further comprises:

a first reflecting mirror which is located between the first light beam splitting means and the second light beam combining means, and which has an angle adjustment mechanism to adjust the first reflecting mirror about two axes; and a second reflecting mirror which is located between the first light beam combining means and the second light beam splitting means, and which has an angle adjustment mechanism to adjust the second reflecting mirror about two axes.

18. The apparatus according to claim 13, wherein the light beam splitting means comprises two half mirrors, each of the first light beam combining means and the second light beam combining means comprises a half mirror, and each of the half mirrors comprises a dichroic mirror having wavelength dependent transmittance characteristics.

19. The apparatus according to claim 13, wherein the light beam splitting means comprises a first light beam splitting element to split the light beam projected from the light source portion into two light beams, and a second light beam splitting element to split one of the two light beams from the first light beam splitting element into two light beams.

20. Illumination apparatus according to claim 13, further comprising a camera that images the sample.

* * * * *